United States Patent [19]

Lai et al.

[11] Patent Number: 5,708,094
[45] Date of Patent: Jan. 13, 1998

[54] POLYBUTADIENE-BASED COMPOSITIONS FOR CONTACT LENSES

[75] Inventors: Yu-Chin Lai, Pittsford; Ronald E. Bambury, Fairport, both of N.Y.

[73] Assignee: Bausch & Lomb Incorporated, Rochester, N.Y.

[21] Appl. No.: 768,748

[22] Filed: Dec. 17, 1996

[51] Int. Cl.$^6$ .................. C08J 5/00; C08L 33/06
[52] U.S. Cl. .................. 525/296; 525/298; 525/301; 525/302; 525/278; 525/279; 525/937; 523/106
[58] Field of Search .................. 525/296, 298, 525/301, 302, 278, 279, 937; 523/106

[56] References Cited

U.S. PATENT DOCUMENTS

| | | | |
|---|---|---|---|
| 3,408,429 | 10/1968 | Wichterle . | |
| 3,660,545 | 5/1972 | Wichterle . | |
| 4,113,224 | 9/1978 | Clark et al. | 249/105 |
| 4,197,266 | 4/1980 | Clark et al. | 264/1 |
| 4,555,732 | 11/1985 | Tuhro | 358/213 |
| 4,910,277 | 3/1990 | Bambury et al. | 526/260 |
| 4,961,954 | 10/1990 | Goldberg et al. | 427/2 |
| 5,002,978 | 3/1991 | Goldenberg | 523/106 |
| 5,070,215 | 12/1991 | Bambury et al. | 556/418 |
| 5,100,689 | 3/1992 | Goldberg et al. | 427/2 |
| 5,271,875 | 12/1993 | Appleton et al. | 264/2.3 |
| 5,290,548 | 3/1994 | Goldberg et al. | 424/78.18 |

OTHER PUBLICATIONS

Fatt, I; Rasson,JE; Melpolder, JB, International Contact Lens Clinic, vol. 14, p. 389 1987 WO.10.

*Primary Examiner*—Irina S. Zemel
*Attorney, Agent, or Firm*—John E. Thomas

[57] ABSTRACT

Contact lenses are made from the polymerization product of a monomer mixture comprising a polybutadiene-based compound as represented by formula (I)

$$E-B(AB)_a-E \quad (I)$$

wherein:

A is selected from the group consisting of a chemical bond, —OCO—, —COO—, —CONH—, —NHCO—, —OCOO—, —NHCOO— and —OCONH—, a is zero or an integer of at least 1;

each B is independently represented by the formula (II)

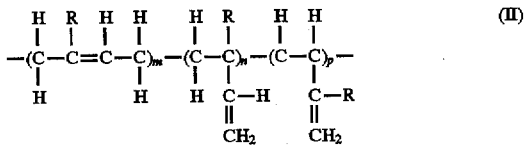

where each of m, n, and p is independently 0 or greater, provided that m+n+p is at least 10;

R is hydrogen or $C_1$-$C_4$ alkyl;

each E is independently a polymerizable terminal ethylenically unsaturated organic group.

12 Claims, No Drawings

POLYBUTADIENE-BASED COMPOSITIONS FOR CONTACT LENSES

BACKGROUND OF THE INVENTION

1. Field of the Invention

This invention relates to novel contact lens materials, including hydrogel or rigid gas permeable (RGP) materials, which are made from the polymerization product of a monomer mixture including a polybutadiene-based compound endcapped with a polymerizable ethylenically unsaturated group.

2. Description of the Related Art

One class of materials useful for soft contact lenses is hydrogel polymers. A hydrogel is a hydrated, cross-linked polymeric system that contains water in an equilibrium state. Hydrogel contact lenses offer relatively high oxygen permeability as well as desirable biocompatibilty and comfort. Existing hydrogel soft contact lens materials are formed of copolymers based primarily on 2-hydroxyethylmethacrylate (Hema), N-vinyl-2-pyrrolidone (NVP) or other hydrophilic monomers, crosslinked with a crosslinking agent. Oxygen permeability of these materials is dependent on the water content of the hydrogel.

Another class of materials useful for soft contact lenses is elastomers. These materials are not hydrated, as are hydrogels, but are sufficiently flexible to be comfortable on the eye.

Contact lenses are also made from rigid, gas permeable (RGP) materials. Generally, RGP materials are formed of copolymers based on silicon or fluorosilicon (meth)acrylates or itaconates, crosslinked with a crosslinking monomer. These materials are very rigid and are not hydrated, but due to the inclusion of a silicon or fluorosilicon monomer these materials have relatively high oxygen permeability.

It has been mentioned that contact lenses may be made of a polyolefin plastic, including polybutadiene. For example, U.S. Pat. Nos. 5,290,548, 5,100,689, and 4,961,954 (Goldberg) describes methods for modifying the surface of contact lenses, and mentions that the lens may be made of a plastic such as polyolefins, in particular polybutadienes. Additionally, it has been mentioned that butadiene may serve as a vinylic comonomer for hydrogel contact lenses, for example, U.S. Pat. No. 5,002,978 (Goldenberg). However, polybutadiene and butadiene do not readily copolymerize with conventional vinylic or (meth)acrylate monomers. Also the polymerization of polybutadiene and butadiene generally results in the loss of oxygen permeability.

The present invention provides a novel contact lens material based on polybutadiene compounds endcapped with a polymerizable ethylenically unsaturated group. These compounds can be readily combined with conventional contact lens monomers, so as to obtain materials in which the desired properties, such as hardness, oxygen permeability, and water content are readily controlled by adjusting monomer concentration. Additionally, these compounds can be molded into lenses by conventional curing processes using free radical polymerization.

SUMMARY OF THE INVENTION

The invention relates to contact lenses made from the polymerization product of a monomer mixture comprising a polybutadiene-based compound as represented by formula (I)

 (I)

wherein:

A is selected from the group consisting of a chemical bond, —OCO—, —COO—, —CONH—, —NHCO—, —OCOO—, —NHCOO— and —OCONH—;

a is zero or an integer of at least 1;

each B is independently represented by the formula (II)

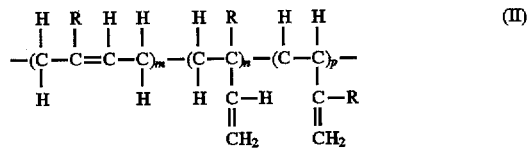 (II)

where each of m, n, and p is independently 0 or greater, provided that m+n+p is at least 10;

R is hydrogen or $C_1$–$C_4$ alkyl;

each E is independently a polymerizable terminal ethylenically unsaturated organic group represented by the formula (III)

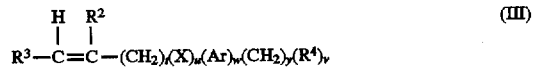 (III)

wherein $R^2$ is hydrogen or methyl;

$R^3$ is selected from the group consisting of hydrogen, alkyl having 1 to 6 carbon atoms, and a —CO—Y'—$R^1$ radical wherein Y' is —O—, —S—, or —NH— and $R^1$ is a $C_1$ to $C_{12}$ alkyl;

each of X and $R^4$ is independently selected from the group consisting of —OCO—, —COO—, —CONH—, —NHCO—, —OCOO—, —NHCOO— and —OCONH—;

Ar is an aromatic radical having 6 to 30 carbon atoms;

each of t and y is independently 0 or an integer of 1 to 6; and each of u, v and w is independently 0 or 1.

A preferred class of compounds of Formula I include those represented by the formula

wherein E is a group of the formula

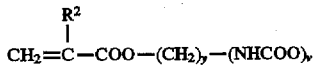

and B is

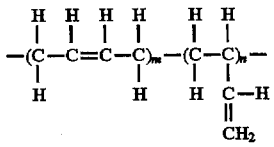

wherein $R^2$ is hydrogen or methyl;

y is 0 or an integer of 1 to 6;

v is 0 or 1; and m+n is at least 10.

DETAILED DESCRIPTION OF THE INVENTION

The contact lens materials of the invention are formed from the polymerization product of a monomer mixture comprising a polybutadiene-based compound as represented by formula (I):

E—B(AB)$_a$—E  (I)

wherein:

A is selected from the group consisting of a chemical bond, —OCO—, —COO—, —CONH—, —NHCO—, —OCOO—, —NHCO— and —OCONH—;

a is zero or an integer of at least 1;

B is represented by the formula (II)

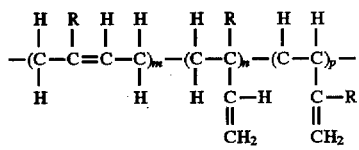

wherein m, n, and p is independently 0 or greater, provided that m+n+p is at least 10;

R is hydrogen or C$_1$–C$_4$ alkyl;

each E is independently a polymerizable terminal ethylenically unsaturated organic group represented by the formula (III)

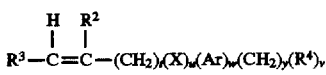

wherein

R$^2$ is hydrogen or methyl;

R$^3$ is selected from the group consisting of hydrogen, an alkyl having 1 to 6 carbon atoms, and a 13 CO—Y'—R$^1$ radical wherein Y' is —O—, —S—, or —NH— and R$^1$ is C$_1$ to C$_{12}$ alkyl;

X and R$^4$ are independently selected from the group consisting of —OCO—, —COO—, —CONH—, —NHCO—, —OCOO—, —NHCOO— and —OCONH—;

Ar is an aromatic radical having 6 to 30 carbon atoms;

each of t and y is independently 0 or an integer of 1 to 6; and each of u, v and w is independently 0 or 1.

One preferred class of compounds of Formula I include those represented by the formula:

E—B—E i.e., compounds of formula (I) wherein a is one and A is a chemical bond.

The polybutadienes of formula (I) specifically include compounds based on 1,3 butadiene (where R is hydrogen) and 2-methyl-1,3 butadiene (where R is methyl). Additionally, preferred B radicals include:

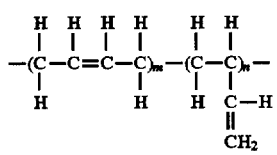

where m+n is at least 10.

A preferred class of E radicals have the formula:

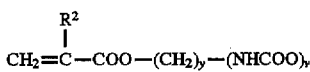

where

R$^2$, y and v are as defined for formula (I).

Various formula (I) compounds are commercially available. Examples are the methacrylate-endcapped polybutadiene (molecular weight 11,000) available from Aldrich (Milwaukee, Wis.), and the acrylate-capped polybutadiene (molecular weight 3,000) available from AtoChem (Philadelphia, Pa.).

Other compounds can be prepared by methods known in the art. As an example, the polybutadiene-based compounds of formula (I) may be prepared by endcapping the polybutadienes of formula (IV):

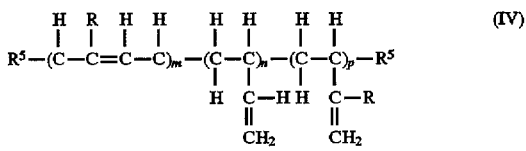

where R$^5$ is a reactive group containing hydroxyl or amino. More specifically, compounds of formula (IV) can be reacted with ethylenically unsaturated radicals according to conventional methods.

As a first example, polybutadiene-based compounds of formula (IV) containing terminal hydroxyl functionality may be reacted with isocyanatoethylmethacrylate to form compounds of Formula (I) wherein E is

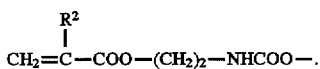

CH$_2$=C—COO—(CH$_2$)$_2$—NHCOO—.

Alternatively, polybutadiene-based compounds of formula (IV) containing terminal hydroxyl functionality may be reacted with (meth)acryloyl chloride to provide a (meth) acrylate terminal radical, or with vinyl chloroformate to provide a vinyl carbonate terminal radical. Various hydroxy-terminated polybutadiene-based compounds of formula (IV) are commercially available from Nippon Soda Co. (Japan).

Polybutadiene-based compounds of formula (IV) containing terminal amino functionality may be reacted with (meth)acryloyl chloride to provide a terminal (meth)acrylamide terminal radical, or with vinyl chloroformate to provide a vinyl carbamate end group.

Monomer mixtures comprising the ethylenically unsaturated monomers of formula (I) may be polymerized by free radical polymerization to form contact lenses according to conventional methods. It has been found that such polymeric shaped articles have sufficiently high oxygen permeability, clarity and strength for use as contact lens materials.

The monomer mixture may employ a compound of formula (I) as the sole monomeric component. Alternately, the monomer mixture may comprise, in addition to the formula (I) compound, conventional monomers used for contact lens applications.

As one example, compounds of formula (I) may be copolymerized with at least one hydrophilic monomer to form a hydrophilic, optically clear copolymer useful as a soft, hydrogel contact lens material. Suitable hydrophilic monomers include: unsaturated carboxylic acids, such as methacrylic and acrylic acids; (meth)acrylic substituted alcohols, such as 2-hydroxyethyl methacrylate and 2-hydroxyethyl acrylate; glyceryl methacrylate; vinyl lactams, such as N-vinyl-2-pyrrolidone; and acrylamides, such as methacrylamide, N,N-dimethylacrylamide, N-(2-hydroxyethyl)-methacrylamide, and N-methacryloyl glycine. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Preferably, the polybutadiene-based compound is included in the initial monomeric mixture at about 50 to about 80 percent by weight, and at least one hydrophilic monomer is included at about 20 to about 50 percent by weight. Either the polybutadiene-based compound or the hydrophilic monomer may function as a crosslinking agent (a crosslinker being defined as a material having multiple polymerizable functionalities). Optionally, a separate crosslinker may be employed in the initial monomeric mixture to provide a crosslinked polymeric article, generally at 0.1 to 20 percent by weight when present.

Additionally, the macromonomers may be copolymerized with monomers such as methylmethacrylate, an itaconate ester, or fluorinated derivatives thereof to form a RGP contact lens materials. Generally, the monomer mixture will further include one of the forementioned hydrophilic monomers as a wetting agent, and optionally a crosslinking agent.

The monomeric mixtures including the formula (I) compound may be polymerized by free radical polymerization, usually in the presence of heat or ultraviolet irradiation. Minor amounts of a free-radical initiator may be included in the monomeric mixture, generally at about 0.1 to about 5 percent by weight. In producing contact lenses, the initial monomeric mixture may be cured in tubes to provide rod-shaped articles, which are then cut into buttons. The buttons may then be lathed into contact lenses. Alternately, contact lenses may be cast directly in molds from the monomeric mixtures, such as by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

The following examples illustrate various preferred embodiments of the present invention.

EXAMPLES 1 and 2

Two monomer mixtures were prepared. The first mixture contained: a methacrylate-endcapped polybutadiene obtained from Aldrich (Milwaukee, Wis.) having a molecular weight of 11,000 (60 parts by weight); toluene (40 parts by weight); and a UV initiator, DAROCUR 1173 (0.5 parts by weight). The second mixture contained: an acrylate-endcapped polybutadiene obtained from AtoChem (Philadelphia, Pa.) having a molecular weight 3,000 (60 parts by weight); toluene (40 parts by weight); and DAROCUR 1173 initiator (0.5 parts by weight).

Two series of films were cast from the two mixtures between glass plates by subjecting the mixtures to ultraviolet irradiation for about two hours. The films were separated from the glass plates, extracted in alcohol, dried and re-extracted with boiling water. The extracted films were then placed in phosphate-buffered saline.

The resultant films were optically clear. Oxygen permeability was measured by the "single-chamber method" (Fatt, I; Rasson, J E; Melpolder, J B, *International Contact Lens Clinic*, vol. 14(10), p 389 1987). Using this method, oxygen permeabilities are measured in units of Dk (Dk equals $10^{-11}$ $cm^2$ mL $O_2$/s mL mmHg). Oxygen permeability of the first set of films (based on the methacrylate-capped polybutadiene) averaged 50 Dk, and oxygen permeability of the second set of films (based on the acrylate-capped polybutadiene) average 33 Dk.

EXAMPLES 3-10

A series of monomer mixtures was prepared by mixing the methacrylate-capped and acrylate-capped polybutadiene described in Example 1 and 2 with N,N-dimethyl acrylamide (DMA) at various ratios. (Examples 3-6 in Table 1 are monomer mixtures including the methacrylate end-capped polybutadiene (MW 11,000), and Examples 7-10 are monomer mixtures including the acrylate end-capped polybutadiene (MW 3,000). The monomer mixtures further included 30.0 weight % toluene and 0.5 weight % DAROCUR 1173 initiator. The monomer mixtures were then cast into films as described in Examples 1 and 2 and extracted as described in Examples 1 and 2. Oxygen permeability of the resultant films was measured as in Examples 1 and 2. Water content of the hydrated films was measured gravimetrically. Mechanical testing of the films was conducted in buffered saline on an Instron instrument, according to a modified ASTM method D-1708 (tensile properties) and D-1938 (tear strength) procedures. Alcohol extractables were determined gravimetrically. The properties of the films are listed in Table I.

TABLE 1

| Poly(butadiene) | MW 11,000 | | | | MW 3,000 | | | |
|---|---|---|---|---|---|---|---|---|
| Compound | 3 | 4 | 5 | 6 | 7 | 8 | 9 | 10 |
| Examples: | | | | | | | | |
| % End-capped polybutadiene | 80 | 70 | 60 | 50 | 80 | 70 | 60 | 50 |
| % DMA | 20 | 30 | 40 | 50 | 20 | 30 | 40 | 50 |
| Properties | | | | | | | | |
| % Extr. | 8.6 | 11.2 | 11.7 | 15.5 | 4.1 | 6.7 | 7.4 | 8.8 |
| % water | 9.7 | 20.0 | 31.6 | 43.1 | 4.1 | 18.6 | 29.4 | 43.0 |
| Dk | 30.6 | 25.5 | 25.9 | 27.2 | 24.6 | 23.6 | 23.5 | 26.5 |
| Modulus g/mm2 | 23 | 22 | 20 | 15 | 41 | 36 | 31 | 24 |
| Tear g/mm | 7.5 | 6.3 | 5.6 | 4.2 | 5.3 | 4.8 | 3.7 | 3.2 |

The mechanical properties (modulus and tear strength) were acceptable for contact lens applications.

For comparison purposes, a hydrated hydrogel of polymacon (a commercial hydrogel containing HEMA as the primary hydrophilic monomer) has a water content of about 38 weight % and an oxygen permeability of about 9 Dk. In contrast, the materials of the invention exhibited a markedly higher oxygen permeability, even the materials having water contents much lower than 38 weight %.

We claim:

1. A contact lens formed from the polymerization product of a monomer mixture comprising a polybutadiene-based compound having the following structure

in which each A is independently selected from the group consisting of a chemical bond or —OCO—, —COO—, —CONH—, —NHCO—, —OCOO—, —NHCOO— and —OCONH—;

a is zero or at least 1;

each B is independently represented by the formula

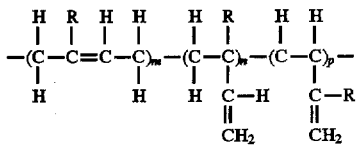

where each of m, n, and p is independently 0 or greater, provided such that m+n+p is at least 10;

R is hydrogen or $C_1$–$C_4$ alkyl;

each E is independently a polymerizable terminal ethylenically unsaturated organic group having the formula:

wherein $R^2$ is hydrogen or methyl;

$R^3$ is selected from the group consisting of hydrogen, an alkyl having 1 to 6 carbon atoms, and a —CO—Y'—$R^1$ radical wherein Y' is —O—, —S—, or —NH— and $R^1$ is a $C_1$ to $C_{12}$ alkyl;

each of X and $R^4$ is independently selected from the group consisting of —OCO—, —COO—, —CONH—, —NHCO—, —OCOO—, —NHCOO— and —OCONH—;

Ar is an aromatic radical having 6 to 30 carbon atoms;

each of t and y is independently 0 or an integer of 1 to 6;

and each of u, v and w is independently 0 or 1.

2. The contact lens of claim 1 wherein the monomer mixture further comprises a hydrophilic monomer.

3. The contact lens of claim 2 wherein the monomer mixture contains about 50 to about 80 weight percent of the polybutadiene-based compound of claim 1.

4. The contact lens of claim 2 wherein the monomer mixture contains about 60 to about 70 weight percent of the polybutadiene-based compound of claim 1.

5. The contact lens of claim 2 wherein the hydrophilic monomer includes at least one member selected from the group consisting of N,N- dimethylacrylamide, N-vinyl-2-pyrrolidone, 2-hydroxyethyl methacrylate, N-(2-hydroxyethyl)-methacrylamide, glyceryl methacrylate and methacrylic acid.

6. The contact lens of claim 2 wherein the monomer mixture further comprises a polymerization initiator.

7. The contact lens of claim 2 wherein the monomer mixture further comprises a crosslinking agent.

8. The contact lens of claim 1 wherein each E is

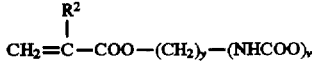

wherein $R^2$ is hydrogen or methyl;

y is 0 or an integer of 1 to 6; and v is 0 or 1.

9. The contact lens of claim 8 wherein each E is

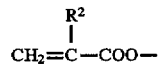

10. The contact lens of claim 9, wherein the polybutadiene-based compound has the formula

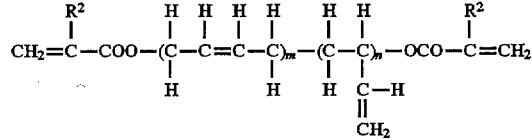

and a molecular weight of 2,000 to 15,000.

11. A hydrogel that is the hydrated polymerization product of a monomer mixture comprising the polybutadiene-based compound having the following structure

in which each A is independently selected from the group consisting of a chemical bond or —OCO—, —COO—, —CONH—, —NHCO—, —OCOO—, —NHCOO— and —OCONH—;

a is zero or of at least 1;

each B is independently represented by the formula

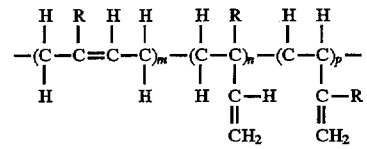

where each of m, n, and p is independently 0 or greater, provided such that m+n+p is at least 10;

R is hydrogen or $C_1$–$C_4$ alkyl;

each E is independently a polymerizable terminal ethylenically unsaturated organic group having the formula:

wherein $R^2$ is hydrogen or methyl;

$R^3$ is selected from the group consisting of hydrogen, an alkyl having 1 to 6 carbon atoms, and a —CO—Y'—$R^1$ radical wherein Y' is —O—, —S—, or —NH— and $R^1$ is a C1 to C12 alkyl;

each of X and $R^4$ is independently selected from the group consisting of —OCO—, —COO—, —CONH —, —NHCO—, —OCOO—, —NHCOO— and —OCONH—;

Ar is an aromatic radical having 6 to 30 carbon atoms;

each of t and y is independently 0 or an integer of 1 to 6;

and each of u, v and w is independently 0 or 1.

12. The hydrogel of claim 11 wherein the monomer mixture further comprises at least one hydrophilic monomer.

* * * * *